United States Patent
Son et al.

(10) Patent No.: US 12,340,306 B2
(45) Date of Patent: Jun. 24, 2025

(54) METHOD FOR TRAINING NEURAL NETWORK FOR DRONE BASED OBJECT DETECTION

(71) Applicant: GYNETWORKS CO., LTD., Incheon (KR)

(72) Inventors: Gang Seok Son, Seoul (KR); Seung On Bang, Seoul (KR)

(73) Assignee: GYNETWORKS CO., LTD., Incheon (KR)

( * ) Notice: Subject to any disclaimer, the term of this patent is extended or adjusted under 35 U.S.C. 154(b) by 422 days.

(21) Appl. No.: 17/564,407

(22) Filed: Dec. 29, 2021

(65) Prior Publication Data

US 2022/0207363 A1  Jun. 30, 2022

(30) Foreign Application Priority Data

Dec. 29, 2020 (KR) .................. 10-2020-0186340

(51) Int. Cl.
- *G06N 3/08* (2023.01)
- *G06V 10/77* (2022.01)
- *G06V 10/774* (2022.01)
- *G06V 10/82* (2022.01)

(52) U.S. Cl.
CPC .......... *G06N 3/08* (2013.01); *G06V 10/7715* (2022.01); *G06V 10/774* (2022.01); *G06V 10/82* (2022.01)

(58) Field of Classification Search
CPC .......... G06N 3/08; G06N 3/045; G06N 3/09; G06V 10/7715; G06V 10/774; G06V 10/82; G06V 20/176; G06V 20/52; G06V 10/50; G06V 10/26; G06V 10/764; G06T 11/00
See application file for complete search history.

(56) References Cited

U.S. PATENT DOCUMENTS

| | | | |
|---|---|---|---|
| 2020/0098130 A1* | 3/2020 | Porter | ................ G06T 7/70 |
| 2020/0117953 A1* | 4/2020 | Cooper | ............... G06V 10/772 |
| 2023/0028237 A1 | 1/2023 | Wei et al. | |

FOREIGN PATENT DOCUMENTS

| | | |
|---|---|---|
| CN | 111507378 A | 8/2020 |
| KR | 10-2019-0056873 A | 5/2019 |

OTHER PUBLICATIONS

Lan et al., "Defect Detection from UAV Images based on Region-Based CNNs," 2018 IEEE International Conference on Data Mining Workshops (ICDMW), pp. 385-390 (6 pages).

Kim et al., "CNN-based Semantic Segmentation using Level Set Loss," 2019 IEEE Winter Conference on Applications of Computer Vision, pp. 1752-1760 (9 pages).

(Continued)

*Primary Examiner* — Jianxun Yang
(74) *Attorney, Agent, or Firm* — WHDA, LLP (57) ABSTRACT

The present invention relates to a method for training a neural network for object detection. The method includes receiving a detection target image, splitting the detection target image into unit images having a predetermined size, defining an output of the neural network for the split unit images as a first label value, generating a first deformed image by deforming the unit image according to a first rule, and training the neural network by using an output of the neural network for the first deformed image and a loss of the first label value. According to the present invention, it is possible to efficiently train a neural network for detecting an object in a large screen.

4 Claims, 10 Drawing Sheets

(56) References Cited

OTHER PUBLICATIONS

Office Action dated Dec. 23, 2022, issued in counterpart KR application No. 10-2020-0186340 with English translation (8 pages).
Written Decision on Registration dated Jun. 17, 2024, issued in counterpart KR application No. 10-2023-0132610 with English translation (2 pages).

* cited by examiner

METHOD FOR TRAINING NEURAL NETWORK FOR DRONE BASED OBJECT DETECTION

BACKGROUND

1. Field

The present invention relates to a method for training a neural network for object detection using a special drone.

2. Description of Related Art

With the development of artificial intelligence technology, artificial intelligence is being used in various technological fields.

In particular, various algorithms based on deep-learning have been developed to track an object through mathematical operations based on pixel values of an input image and classify the tracked object, and convolutional neural network (CNN) models combined by a plurality of layers that perform a convolution operation on feature values defined in a matrix have been optimized and used depending on an applied domain.

In addition, currently, methods for well training the neural network model as well as optimizing the neural network model itself are also being devised. At the same time, in order to secure a number of training images used for training, training methods, such as augmentation by modifying the existing training image or generation of a virtual image using a neural network, are also being diversified.

That is, a neural network used for object recognition is an important issue in practical application of the optimized neural network structure and high-quality training data for faster and more accurate object detection by using an image as an input.

In particular, when a detection target object is a person, it is more difficult to secure training data because diversity of shapes and states is very large compared to other objects, and various social issues such as the use of personal information may also be a problem.

In addition, for purposes such as searching for missing persons among situations where human detection is required or lifesaving through such searches, for urgent and efficient searching, large-screen images taken over a wide area, such as aerial photos, are used, but it is more difficult to extract a complex background in a large screen and a person with a very small size compared to the entire screen than searching for a general object.

Therefore, in order to detect a person as an object to be tracked, it is necessary to devise a method for more efficiently training a neural network and a searching method accordingly.

SUMMARY

An object of the present invention provides a method for more efficiently training a neural network for object tracking.

Another object of the present invention provides a method for augmenting training data of a neural network and performing training through the augmentation so as to have a higher prediction rate.

Still another object of the present invention provides a method for more effectively detecting an object located in a local area from a large-screen image using a trained neural network.

In an aspect of the present invention, a method for training a neural network for object detection based on deep-learning includes receiving a detection target image, splitting the detection target image into unit images having a predetermined size, defining an output of the neural network for the split unit images as a first label value, generating a first deformed image by deforming the unit image according to a first rule, and training the neural network by using an output of the neural network for the first deformed image and a loss of the first label value.

In the defining of the output as the first label value, a value output by using a second deformed image generated by deforming the unit image according to a second rule as an input to the neural network may be defined as the first label value.

A deformation of the first rule for quantitatively defining a deformation degree of the unit image may be higher than that of the second rule.

In the splitting, the detection target image may be split into the unit images by moving a search window having the predetermined size according to a predetermined interval.

The method may further include extracting a unit image having a confidence score for existence of the object equal to or greater than a threshold value among the split unit images, in which, in the generating, the first deformed image may be generated by deforming the extracted unit image.

BRIEF DESCRIPTION OF DRAWINGS

FIGS. 8 to 9B are diagrams illustrating a method for extracting a unit image for training of a neural network according to an embodiment of the present invention.

DETAILED DESCRIPTION

The following description illustrates only a principle of the present invention. Therefore, those skilled in the art may implement the principle of the present invention and invent various devices included in the spirit and scope of the present invention although not clearly described or shown in the present specification. In addition, it is to be understood that all conditional terms and embodiments mentioned in the present specification are obviously intended only to allow those skilled in the art to understand a concept of the present invention in principle, and the present invention is not limited to embodiments and states particularly mentioned as such.

The above-mentioned objects, features, and advantages will become more obvious from the following detailed description provided in relation to the accompanying drawings. Therefore, those skilled in the art to which the present invention pertains may easily practice a technical idea of the present invention.

Further, in describing the present invention, in the case in which it is judged that a detailed description of a well-known technology associated with the present invention may unnecessarily make the gist of the present invention unclear, it will be omitted. Hereinafter, embodiments of the present invention will be described in detail with reference to the accompanying drawings.

Hereinafter, embodiments will be described in more detail with reference to FIG. 1.

Figure 1:
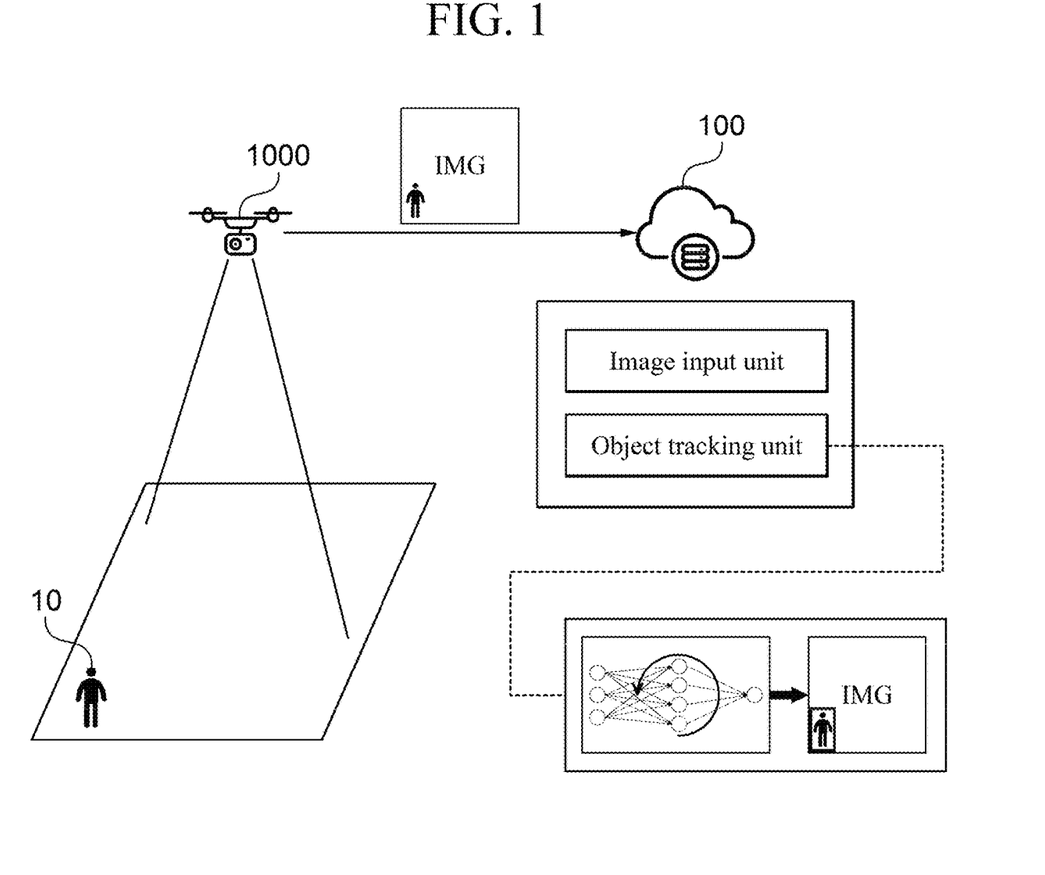
FIG. 1 is a diagram illustrating a structure of a system for performing object detection according to an embodiment of the present invention.

FIG. 1 is a diagram illustrating a structure of a system for performing object detection according to an embodiment of the present invention.

Referring to FIG. 1, the object detection system according to the present embodiment may include a photographing device for photographing a large area and a server for receiving and processing images photographed therefrom.

In the case of FIG. 1, the photographing device may be mounted on a flightable object such as a drone 1000, and thus, transmits an image obtained by photographing a ground during flight to the server 100 using a communication network, and the server 100 transmits an object within the image.

In addition, in addition to the flightable object such as the drone 1000, it is also possible to detect whether an object exists in the photographed image by using a fixed urban infrastructure to monitor a certain area such as CCTV.

The server 100 may be configured in a form capable of network communication and implemented in a cloud form, and thus, may receive and process images photographed by various photographing devices.

In addition, the server 100 may use the collected images as training data, and thus, may be configured to include a cloud-based memory for this purpose.

Specifically, the server 100 may include an image input unit that receives the photographed image such as a camera or CCTV mounted on the drone and an object tracking unit that tracks an internal object 10 through the image input unit.

The object tracking unit may track an object in an image using a trained neural network based on deep-learning, and in particular, in the case of the present embodiment, may be trained to effectively track an object corresponding to a local area in a large-screen image taken over a large area. This will be described in more detail below with reference to FIG. 2.

Figure 2:
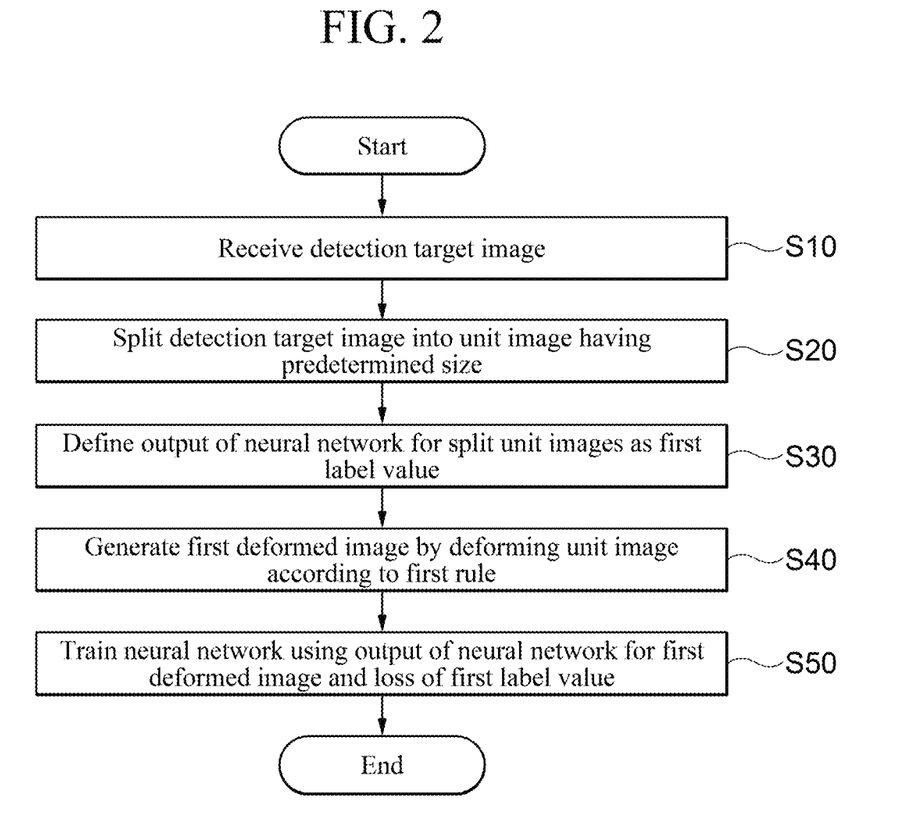
FIG. 2 is a flowchart illustrating a method for training a neural network for object tracking according to an embodiment of the present invention.

FIG. 2 is a flowchart illustrating a method for training a neural network for object tracking according to an embodiment of the present invention.

First, the detection target image is received for training (S10).

The detection target image is photographed by the above-described camera device and may be a large area image taken at once for faster tracking according to a purpose such as lifesaving, or may be a large-screen image.

The large-screen image may be, for example, an image composed of 16 million or more pixels with 5472 horizontal and 3078 vertical pixels, or 12 million or more pixels of 4000*3000.

That is, the drone acquires an image of the ground composed of 10 million or more pixels during flight, and detects an object having a very small size compared to the entire area in the acquired large-screen image.

An actual human-like object may be located in an area corresponding to several thousandths to several ten thousandths within one image, and therefore a large amount of computation is required to track the object. In addition, there is a problem in that it requires a lot of resources compared to the effect for humans to search and label each large-screen image for training.

Therefore, in the present embodiment, the input image is split into unit images to perform more efficient tracking, and layers in the neural network are also trained based on the split unit images (S20).

Figure 3:
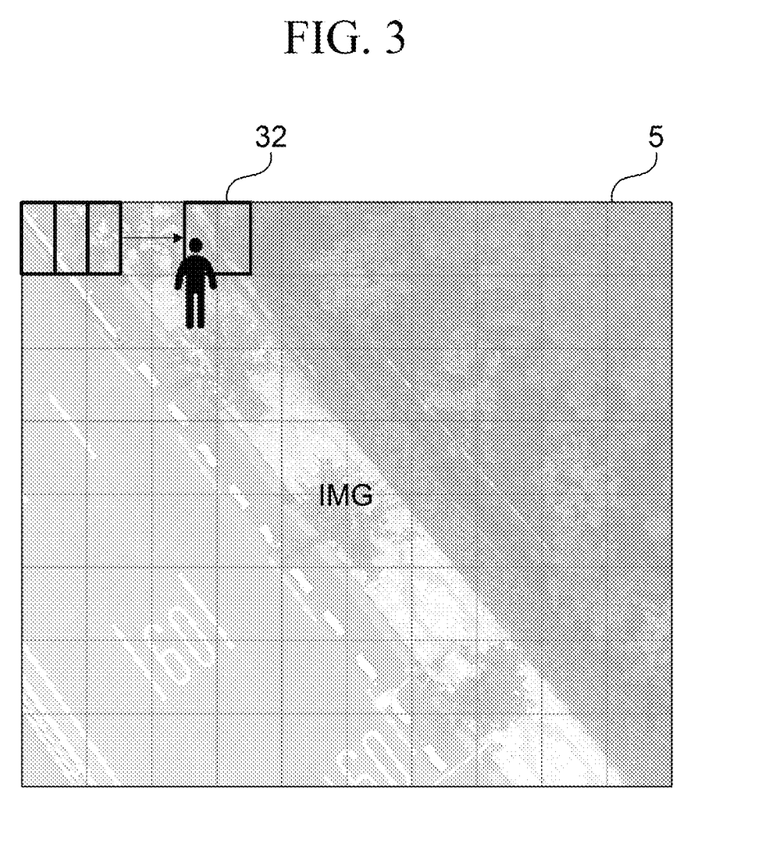
FIGS. 3 and 4 are diagrams illustrating a method for splitting a unit image of a neural network for object tracking according to an embodiment of the present invention.

In detail, referring to FIG. 3 to describe a method for splitting a unit image, in the present embodiment, a search window 32 having a predetermined size may be used for the large-screen image 5.

That is, the image area within the search window 32 is split into one unit image and used for tracking.

Also, in the present embodiment, when the large-screen image 5 is split into unit images, it is possible to allow overlap between some unit images.

Figure 4:
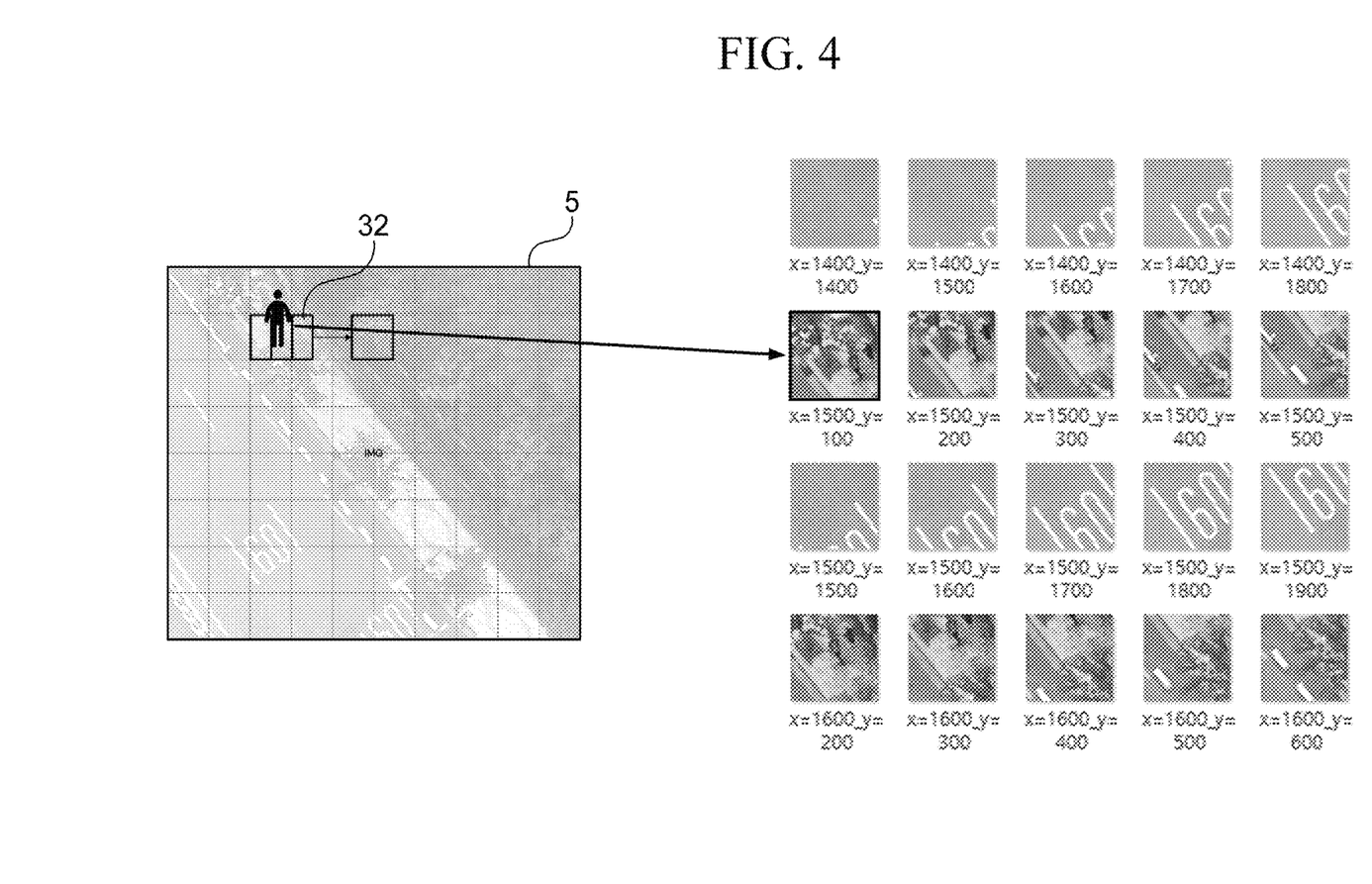

Referring to FIG. 4, it may be defined to move the search window within the area of the large-screen image and split the unit image, but move at an interval smaller than the size of the search window based on the moving direction.

Therefore, a larger number of unit images may be secured, and thus, the neural network may be trained better and a tracking rate of an object may increase.

For example, a plurality of unit images may be split by using a 448×448 search window for an original large-screen image of 5472 horizontal and 3078 vertical pixels by defining a movement interval of 100 pixels.

Next, for training, the output of the neural network for the split unit images is defined as a first label value.

In other words, it is possible to update various weights or biases used in calculations by labeling the existence or non-existence of objects or the location of objects in the neural network with supervised training and backpropagating the error between the output detection result and the labeling value in the neural network.

Figure 5:
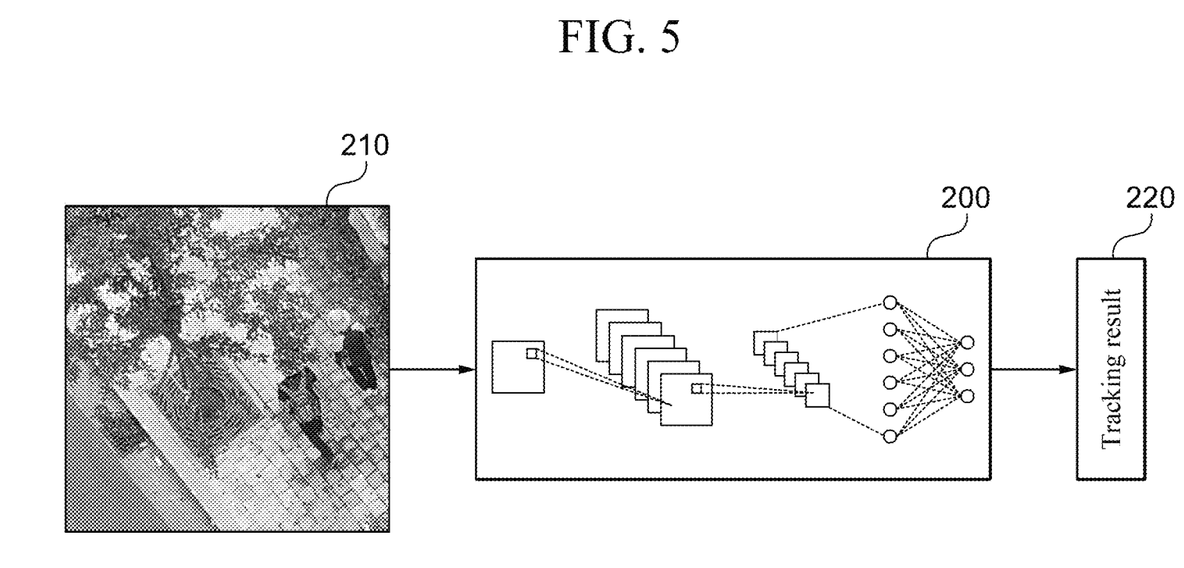
FIGS. 5 to 7 are diagrams illustrating a method for training a neural network for object tracking according to an embodiment of the present invention.

Referring to FIG. 5, specifically, in the present embodiment, the neural network may be implemented in the form of a convolution neural network (CNN), and output a feature map through a convolution operation on pixel values in an input image and output the existence probability value of the object as a confidence score by flattening the feature map.

That is, in the present embodiment, the neural network may be pre-trained through the already labeled unit image.

In the present embodiment, additional training is performed by deforming the unit image for more accurate training. That is, a first deformed image may be generated by deforming the unit image according to a first rule.

The neural network also performs training on the deformed image. The neural network is trained using the output of the neural network for the first deformed image and the loss of the first label value.

In this case, the first label value is a value that affects the first rule, which is a deformation rule of an image, and when the first label value also includes, for example, a value for a location, the first rule is applied to the corresponding labeling value, so training may be performed using the corrected labeling value.

Furthermore, in the present embodiment, in addition to the supervised training through the above labeling values, semi-supervised training may be performed to further train the neural network.

This will be described in more detail below with reference to FIGS. 6 and 7.

In the present embodiment, the neural network performs training on the unlabeled unit image for the labeling value, and thus, may be utilized in a lifesaving area where it is relatively difficult to secure the training data.

Specifically, the neural network performs training using different deformations for the same unit image, and thus, has robust performance under various photographing conditions affected by image acquisition.

That is, the deformation is performed through the second rule together with the first rule on the unit image, which is the training object.

When the deformed image pair for the unit image is generated, the neural network is trained using the deformed image pair. In the present embodiment, the second deformed image generated by being deformed according to the second rule is used as an input to the neural network, and the output value may be defined as the first label value.

That is, the first label value at this time may be set irrespective of ground-truth.

However, the second rule is defined as having less deformation strength quantitatively defining the degree of deformation of the unit image than that of the first rule, and thus, defines that the trained neural network is able to more easily track an object for the unit image than for the deformed image according to the first rule. Alternatively, the first rule can define the image using various parameters compared to the second rule.

Figure 6:
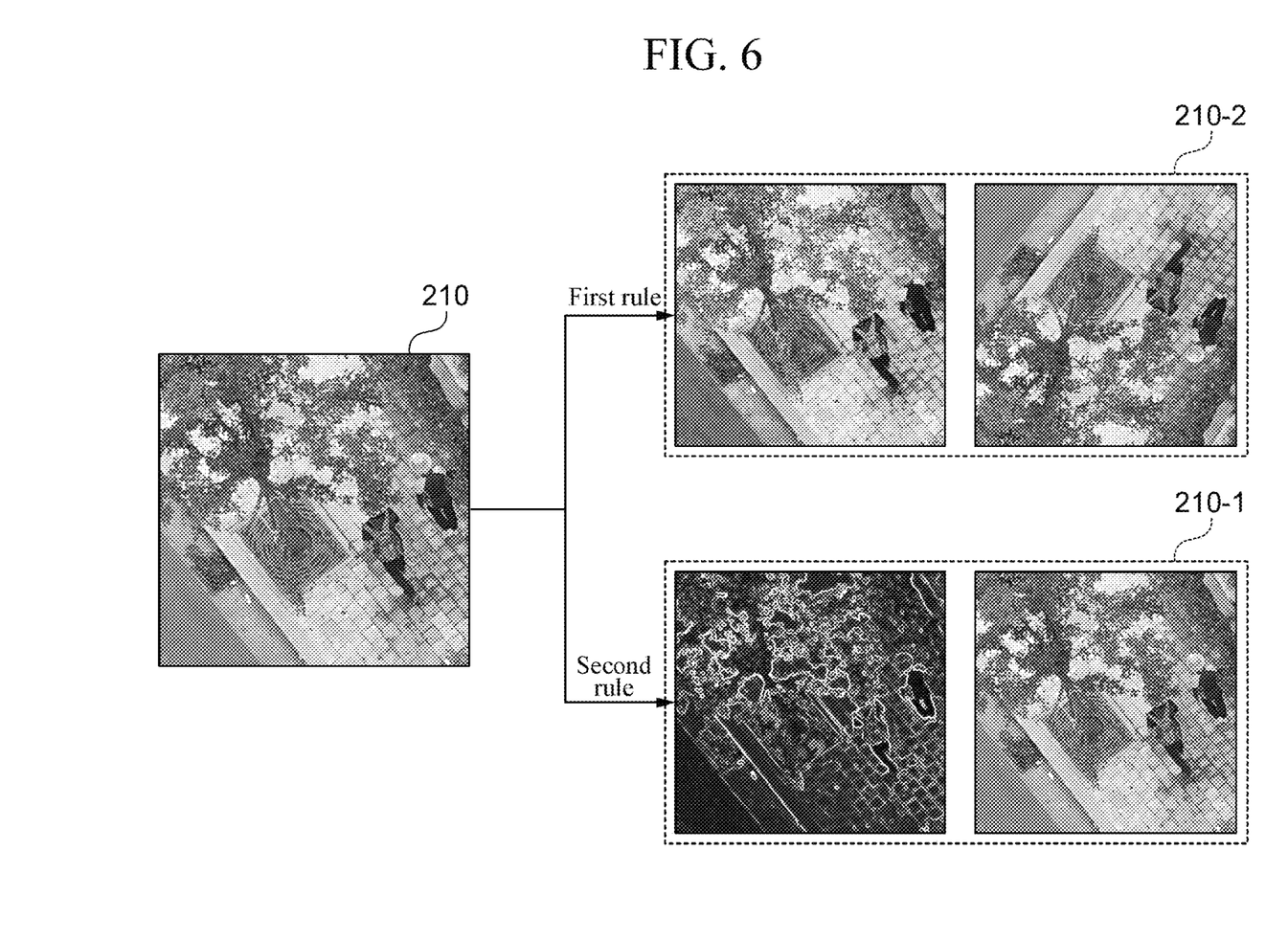
Figure 7:
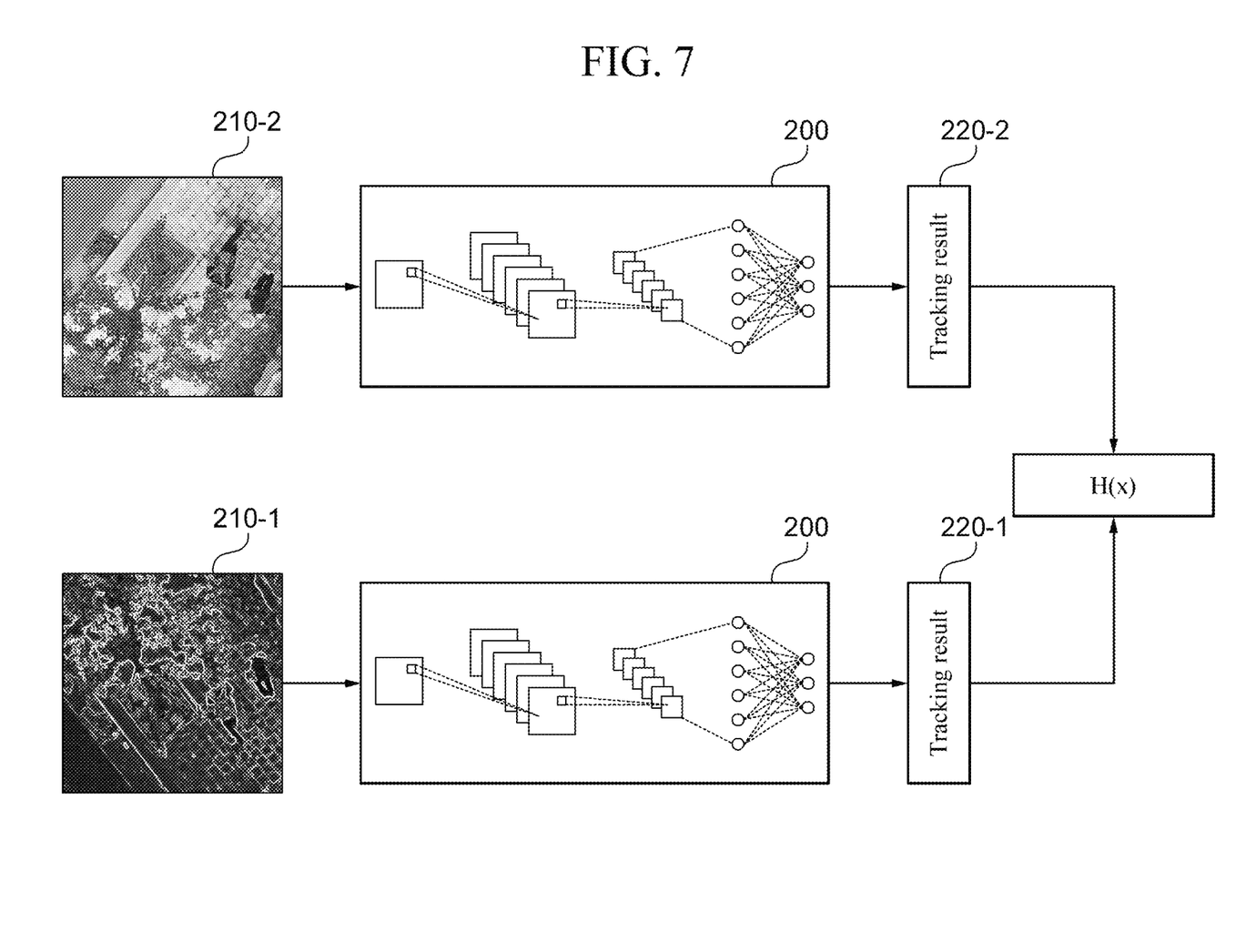

Referring to FIG. 6, the second rule according to the present embodiment enables color conversion (hue, saturation, brightness) of a part of the original unit image, and may generate a deformed image 210-2 through vertical or horizontal inversion.

On the other hand, the first rule may generate an image 210-1 according to a stronger deformation by inverting a color or cutting out a part of the image or removing features of pixels having a specific value using histogram equalization. The training is performed using the divided deformed images.

A specific training method will be described with reference to FIG. 7. In the present embodiment, the error for the output 210-1 of the neural network according to the first deformed image 210-1 using the output 220-2 of the neural network 200 for the second deformed image 210-2 is calculated, which may be used for the training of the neural network.

The difference in the output of each neural network for the two deformed images may be calculated with a cross-entropy function (H(x)), and since the original image is the same, even if the original image is deformed, the training of the neural network 200 is performed for the final purpose of outputting the same object tracking result.

Specifically, the output of the neural network for the second deformed image 210-2 used as a synthetic correct answer is the value of the output itself, and can calculate an error from the output according to the first deformed image 210-1 by using a probability percentage with respect to the existence probability of the object, but can define and use the existence or non-existence of the output for the second deformed image 210-2 like the ground-truth as a binary value based on the threshold value.

That is, in the present embodiment, since the neural network 200 may achieve purposes such as fast lifesaving by performing tracking on various unit images for tracking and searching for unit images in which an object exists exactly, and therefore may be trained using the existence or non-existence of the object.

Furthermore, in the present embodiment, when the entire unit image extracted from the large-screen image is deformed and used for training, due to the nature of the original image such as lifesaving, a ratio of the image in which the object exists and a ratio of the image in which the object does not exist are very different.

In other words, since the number of unit images themselves including objects located in the local area of the large-screen image is very small, when data is augmented at the same ratio, this difference becomes larger and may affect the training performance of the neural network.

Accordingly, in the present embodiment, the deformed target image may be extracted through a simplified operation on the split unit images.

Figure 8:
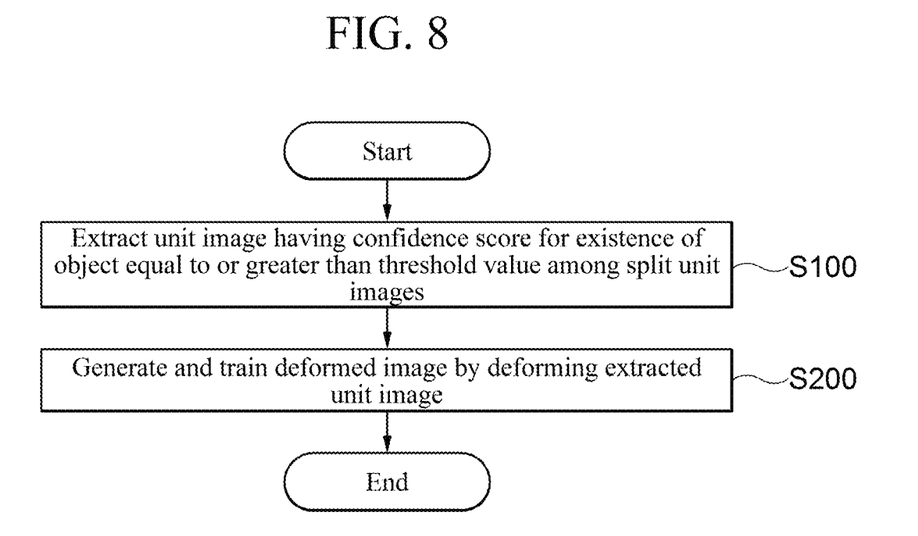

This will be described with reference to FIGS. 8 to 9B.

In the method for training a neural network according to the present embodiment, a unit image having a confidence score for the existence of an object equal to or greater than a critical confidence score among the split unit images is extracted (S100).

That is, in the present embodiment, in the semi-supervised training, the ground-truth for the existence or non-existence of the object in the unit image is not used as the labeling value, but the image in which the object is highly likely to exist in the unit image may be extracted.

Specifically, for the original large-screen image, only images whose object tracking probability for the split unit images is greater than or equal to the critical confidence score are extracted and used as the deformation target. In this case, the critical confidence score is for the extraction of the training target, not for tracking the actual object, and thus, may be set to be relatively low. For example, a unit image including a tracking result with a confidence score of 10% or more may be deformed into a target.

Figure 9A:
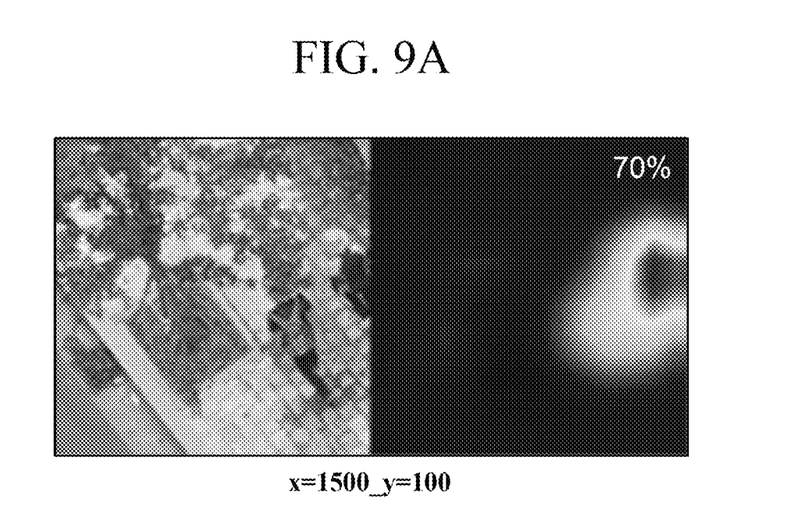
Figure 9B:
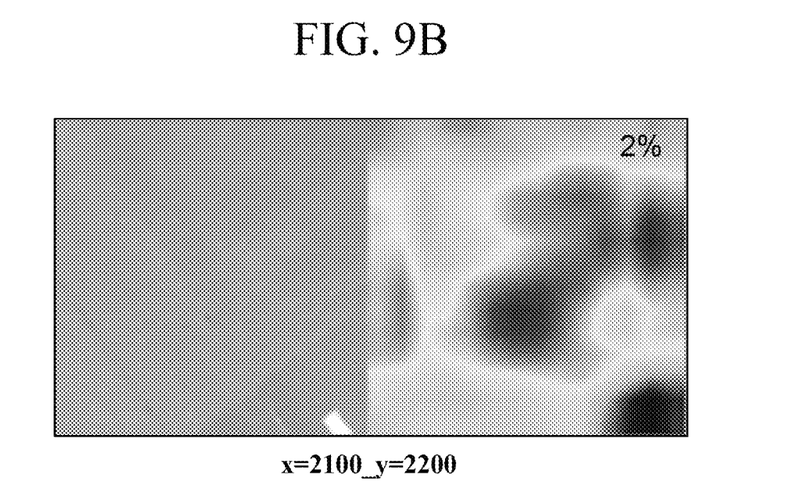

Referring to FIGS. 9A and 9B, the image of FIG. 9A output with a confidence score of 70% in which a person, who is an object to be tracked, among the unit images exists is used for training through deformation, and in the case of an image of FIG. 9B, the confidence score is 2%, which is less than or equal to the critical confidence score, and therefore, may not be used for training.

In addition, in order to secure a more balanced training data, it is possible to construct the training data set according to the confidence score using the confidence score, and to deform the unit image in each training data set and use the deformed unit image for training.

In this case, the extraction of the usable unit images as the training data may be performed through the deformation of the output end of the neural network. That is, instead of flattening the feature map output from the convolution layer into a one-dimensional matrix using a general fully connected layer, the feature map is extracted for each channel, but the degree of influence on the objects for each channel may be calculated as a weight, and the weight at this time may be multiplied by the feature maps for each channel and output in the form of the heat map. By integrating the heat maps, a position affecting the tracking of an object may be highlighted for each unit image as illustrated in FIG. 8.

Therefore, in the present embodiment, the image to be used as the training data may be extracted and deformed into a unit image including pixels affecting the tracking of the object with the critical confidence score or more.

The first deformed image and the second deformed image are generated by deforming the unit image extracted through the above process, and are trained according to the above-described supervised or semi-supervised training method (S200).

Figure 10:
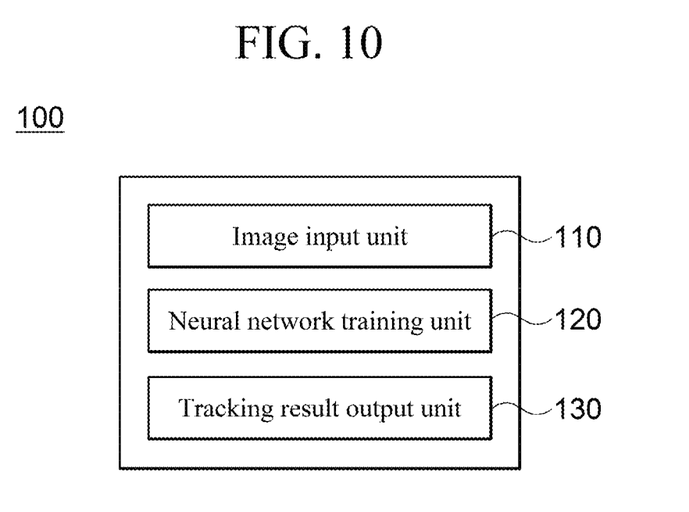
FIG. 10 is a diagram illustrating a configuration of a server for tracking an object according to an embodiment of the present invention.

Hereinafter, the server 100 performing the above-described training of the neural network and object tracking will be described with reference to FIG. 10.

The server 100 may include an image input unit 110, a neural network training unit 120, and a tracking result output unit 130.

As described above, the image input unit 110 receives images photographed from various photographing devices such as drones or CCTVs. In addition, in the present embodiment, a high-quality large-screen image obtained by photographing a wider area in order to track a person for the same purpose as lifesaving may be received.

Next, the neural network training unit 120 may train the neural network for object tracking.

Specifically, in the present embodiment, the neural network may split the original large-screen image into unit images and use the original large-screen image for training.

That is, the entire unit image is searched using the search window of a specified size and the plurality of unit images are extracted. Furthermore, by setting the movement interval for the search of the search window to be smaller than the size of the window, overlapping of some unit images is allowed, thereby increasing the training effect.

Furthermore, the neural network training unit 120 may perform supervised or unsupervised training.

That is, the supervised learning may be performed when the correct answer value is previously labeled for the unit image. However, as described above, since it may be inefficient to manually determine all images in order to label objects existing in only a few of the unit images corresponding to tens of thousands of images, training efficiency may be increased by using the unsupervised learning methods together.

Accordingly, the neural network training unit 120 uses the unlabeled unit image for training, but generates a deformed image pair by classifying the deformation rule of the unit image.

In this case, the deformation rule may be classified according to the deformation strength, and the first deformed image having higher deformation strength and the second deformed image having lower deformation strength are used for training.

Since each deformed image is an absolute value that does not change whether an object exists or not even if it is deformed, it is used for training the neural network for the purpose of making the output of each image similar.

Specifically, since the second deformed image is less deformed, it may be set to an arbitrary labeling value, and the neural network may be trained using the error between the output value of the first deformed image and the corresponding labeling value.

Also, instead of using the predicted probability value for the second deformed image as it is, it is also possible to perform training through the binary value for the existence or non-existence of the object.

The tracking result output unit 130 outputs the tracking result of the object using the above trained neural network.

In this case, the tracking result output unit may also track the object by splitting the original large-screen image into unit images in the same way as in the training method, and can track the object by splitting the large-screen image into a plurality of unit images using the search window.

According to the present invention, it is possible to efficiently train the neural network for detecting the object in the large screen.

In addition, the present invention uses the trained neural network to augment the training data for the object located in the local area from the actual large-screen image, thereby increasing the training performance of the neural network and having the robust performance against the change in external environment.

Furthermore, various embodiments described herein may be implemented in a recording medium readable with a computer or a similar device using, for example, software, hardware, or a combination thereof.

According to a hardware implementation, the embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions. In some cases, the embodiments described in the disclosure may be implemented by the control module itself.

According to the software implementation, embodiments such as procedures and functions described in the disclosure may be implemented by separate software modules. Each of the software modules may perform one or more functions and operations described in the disclosure. The software code may be implemented as a software application written in a suitable programming language. The software code may be stored in the memory module and executed by the control module.

The spirit of the present invention has been described only by way of example hereinabove, and the present invention may be variously modified, altered, and substituted by those skilled in the art to which the present invention pertains without departing from essential features of the present invention.

According to the present invention, it is possible to efficiently train a neural network for detecting an object in a large screen.

In addition, the present invention uses a trained neural network to augment training data for an object located in a local area from an actual large-screen image, thereby increasing training performance of the neural network and having robust performance against a change in external environment.

In addition, according to the present invention, it is possible to reduce costs required for human search or rescue by using a neural network.

Accordingly, the embodiments disclosed in the present invention and the accompanying drawings do not limit but describe the spirit of the present invention, and the scope of the present invention is not limited by the embodiments and the accompanying drawings. The scope of the present disclosure should be interpreted by the following claims and it should be interpreted that all spirits equivalent to the following claims fall within the scope of the present disclosure.

What is claimed is:

1. A method for training a neural network for object detection based on deep-learning, the method comprising:
   receiving a detection target image;
   splitting the detection target image into unit images having a predetermined size;
   generating a first deformed image by deforming the unit images according to a first rule;
   generating a second deformed image by deforming the unit images according to a second rule;
   defining an output of the neural network for the second deformed image as a first label value; and
   training the neural network by using a loss calculated between an output of the neural network for the first deformed image and the first label value, wherein the unit images include pixels that influence a tracking of the object, each pixel being an output of a heat map generated by multiplying a feature map extracted from each channel of a convolution layer of the neural network by a corresponding weight obtained from an output of a fully connected layer of the neural network, wherein a deformation of the first rule for quantitatively defining a deformation degree of the unit images is higher than that of the second rule, and wherein the first label value is defined as a binary value based on a threshold.

2. The method of claim 1, wherein, in the splitting, the detection target image is split into the unit images by moving a search window having the predetermined size according to a predetermined interval.

3. The method of claim 1, further comprising:
extracting a unit image having a confidence score for existence of the object equal to or greater than a threshold value among the split unit images,
wherein, in the generating, the first deformed image is generated by deforming the extracted unit image.

4. A non-transitory recording medium in which a program for performing a method for training a neural network for object detection based on deep-learning is recorded, wherein the method includes:

receiving an image to be detected;
splitting the detection target image into unit images having a predetermined size;
generating a first deformed image by deforming the unit images according to a first rule;
generating a second deformed image by deforming the unit images according to a second rule;
defining an output of the neural network for the second deformed image as a first label value; and
training the neural network by using a loss calculated between an output of the neural network for the first deformed image and the first label value,
wherein the unit images include pixels that influence a tracking of the object, each pixel being an output of a heat map generated by multiplying a feature map extracted from each channel of a convolution layer of the neural network by a corresponding weight obtained from an output of a fully connected layer of the neural network,
wherein a deformation of the first rule for quantitatively defining a deformation degree of the unit images is higher than that of the second rule, and
wherein the first label value is defined as a binary value based on a threshold.

* * * * *